(12) United States Patent
Nicholson et al.

(10) Patent No.: US 11,457,156 B2
(45) Date of Patent: Sep. 27, 2022

(54) DEVICE HAVING A CAMERA OVERLAID BY DISPLAY

(71) Applicant: Lenovo (Singapore) Pte. Ltd., New Tech Park (SG)

(72) Inventors: John Weldon Nicholson, Cary, NC (US); Howard Locker, Cary, NC (US); Daryl C. Cromer, Raleigh, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 0 days.

(21) Appl. No.: 17/170,413

(22) Filed: Feb. 8, 2021

(65) Prior Publication Data

US 2022/0256070 A1    Aug. 11, 2022

(51) Int. Cl.
*H04N 5/235* (2006.01)
*H04N 9/30* (2006.01)
*H04N 5/232* (2006.01)

(52) U.S. Cl.
CPC ....... *H04N 5/2354* (2013.01); *H04N 5/23293* (2013.01); *H04N 9/30* (2013.01)

(58) Field of Classification Search
CPC ..... H04N 5/2354; H04N 5/23293; H04N 9/30
See application file for complete search history.

(56) References Cited

U.S. PATENT DOCUMENTS 10,157,590 B1 * 12/2018 Aflatooni ............... G06V 40/13
2021/0304663 A1 * 9/2021 Kim ..................... G09G 3/3275

* cited by examiner

*Primary Examiner* — Yogesh K Aggarwal
(74) *Attorney, Agent, or Firm* — The Small Patent Law Group LLC; Dean D. Small

(57) ABSTRACT

A device is provided that includes a display stack having display pixels. The device also includes a substrate including at least one camera sensor located proximate to the display stack, and one or more light elements located proximate the at least one camera sensor. The device additionally includes a processor, and a memory storing program instructions accessible by the processor. Responsive to execution of the program instructions, the processor is configured to obtain display information associated with the display pixels, and modify the one or more light elements based on the display information.

20 Claims, 5 Drawing Sheets

DEVICE HAVING A CAMERA OVERLAID BY DISPLAY

FIELD

The present disclosure relates generally to implementing a camera behind a display of a device.

BACKGROUND OF THE INVENTION

Common smartphones, tablets, laptop computers, and other mobile electronic devices include both a display surface and a front-facing camera on the front side of the device. Display technologies employed in these mobile electronic devices include liquid-crystal display (LCD) or active-matrix organic light-emitting diode (AMOLED). Typically, the display surface does not occupy the full front side of the mobile electronic device because a bezel, border, or notch is required to accommodate the lens of the front-facing camera. As a result, the size of the display surface is reduced. Given the limited area of the front surface of mobile electronic devices, it is desirable to eliminate any bezels, borders, or notches to increase the display area.

A front-facing camera of a mobile electronic device may be used for taking self-portraits and for video calls, as well as other applications. Front-facing cameras continue to increase in resolution to increase the quality of images and videos captured thereby. Such systems are considered camera-under-display (CUD) systems because camera sensors are placed under the display screen.

In CUD systems, there can be display artifacts from the camera region of the display. At a fundamental level, the display includes openings in the display stack around the display pixels to let light through to the camera sensors sitting underneath. When the display is in use normally, without utilizing the camera, those openings are just black, providing an aesthetically undesirable appearance.

Currently, to address, display pixels may be reduced to minimize any artifact in the display for the camera display pixels of the CUD region. While the reduced camera display pixels in the CUD region improve artifacts, the reduced camera display pixels also typically decrease the lifetime of the display due to the wear and reduced density of the camera display pixels in the CUD region. Specifically, by changing the wear-out mechanism of the camera display pixels, different wear patterns for the CUD region and the rest of the display occurs.

SUMMARY

In accordance with embodiments herein, a device, is provided that includes a display stack having display pixels. The device also includes a substrate including at least one camera sensor located proximate to the display stack, and one or more light elements located proximate the at least one camera sensor. The device additionally includes a processor, and a memory storing program instructions accessible by the processor. Responsive to execution of the program instructions, the processor is configured to obtain display information associated with the display pixels, and modify the one or more light elements based on the display information.

Optionally, the display stack includes an upper layer having the display pixels and a bottom cathode layer; and the substrate is below the bottom cathode layer. In one aspect, the display pixels include camera display pixels that are positioned proximate of the at least one camera sensor. In another aspect, the camera display pixels have a density that is less than a density of non-camera display pixels. In one example, the camera display pixels define openings utilized by the at least one camera sensor to obtain image data. Alternatively, the one or more light elements are positioned to emit an auxiliary light output through the openings defined by the camera display pixels. In one embodiment, the one or more light elements are light emitting diodes.

Optionally, the display information includes at least one of color of display pixels, or brightness of display pixels. In another aspect, to modify the one or more light elements includes at least one of activating the one or more light elements, changing a color of an auxiliary light output from the one or more light elements, changing an intensity of the auxiliary light output from the one or more light elements, or deactivating the one or more light elements. In one example, to modify the one or more light elements includes matching a color of a light element of the one or more light elements to a color of a display pixel of the display pixels.

In accordance with embodiments herein, a method is provided where under control of one or more processors including program instructions the method includes emitting, with display pixels of a display stack, a display light output. The method also includes sensing, with at least one camera sensor of a substrate located proximate to the display stack, image data through openings defined by camera display pixels of the display pixels, the camera display pixels located proximate the at least one camera sensor. The method also includes obtaining display information associated with the display light output, and modifying one or more light elements positioned proximate the at least one camera sensor to emit an auxiliary light output through the openings defined by the camera display pixels based on the display information.

Optionally, to modify the one or more light elements includes activating at least one light element of the one or more light elements. Alternatively, to modify the one or more light elements includes at least one of changing a color or brightness of an auxiliary light output of the one or more light elements. In one aspect, to modify the one or more light elements includes deactivating at least one light element of the one or more light elements. In another aspect, to obtain the display information includes at least determining a brightness or color of a display pixel of the display pixels. In one example, to obtain the display information includes only obtaining the display information from the camera display pixels.

In accordance with embodiments herein, a device is provided that includes a substrate including at least one camera sensor configured to obtain image data, and a first light element located proximate the at least one camera sensor. The device also includes a processor, and a memory storing program instructions accessible by the processor. Responsive to execution of the program instructions, the processor is configured to obtain display information associated with camera display pixels of a display substrate proximate to the at least one camera sensor, and modify the first light element based on the display information.

Optionally, the first light element is a light emitting diode. In one aspect, the device includes a second light element located proximate the at least one camera sensor, wherein the processor is further configured to modify the second light element to be one of a different color or brightness than the first light element based on the display information. In another aspect, the device includes a second light element located proximate the at least one camera sensor, wherein the processor is further configured to activate the first light element while deactivating the second light element based on the display information.

DETAILED DESCRIPTION

Figure 1:
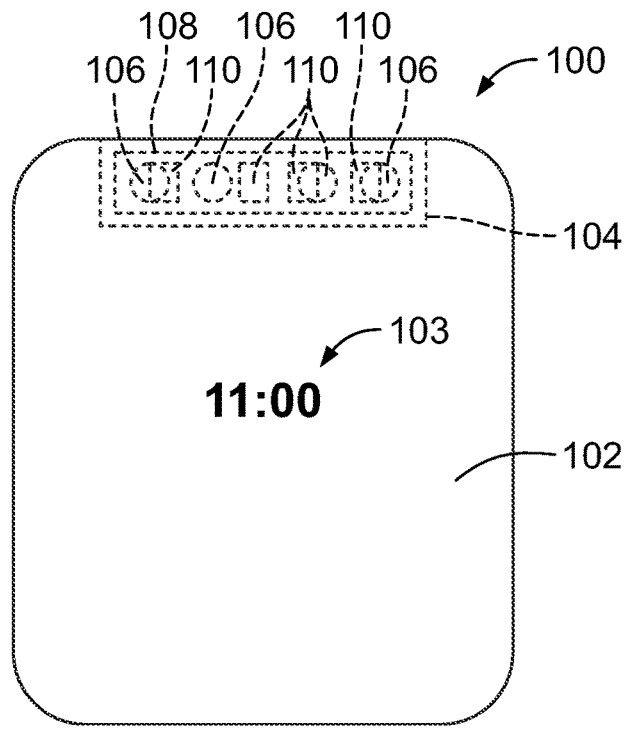
FIG. 1 illustrates a simplified block diagram of an electronic device in accordance with an embodiment.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Provided is a system and method for improving the aesthetic appearance of images on a display screen for an electronic device that utilizes a CUD. One or more light elements, such as light emitting diodes (LED) are positioned proximate to openings defined by camera display pixels of a display stack in a CUD region. Each light element emits through the openings defined by the camera display pixels to fill in the spaces created by the reduced density of the camera display pixels in the CUD region. Display information is then obtained by the system to determine characteristics of the image on the display such as color, brightness, or the like. Based on the display information, the auxiliary light output of the light elements may change in order to match the characteristics of the display. In this manner, the light elements fill in the openings defined by the camera display pixels in the CUD region to provide an aesthetically pleasing appearance that is maintained through the lifetime of the display.

The term "display pixel(s)" shall mean any area of illumination on a display screen that combines to form an image on the display screen. The area of illumination is an image element. The image formed may be a solid color, strip, item, person, numbers, letters, background, boarder, etc.

The term "camera display pixel(s)" shall mean any and all display pixels that are proximate to camera sensors. In this manner, the camera display pixels either block, partially block, or define openings that allow the passage of light so that the camera sensors can obtain image data. Specifically, the camera display pixels include display pixels that can affect the degree of light capture of the camera sensors. The camera display pixels are only in the proximate area of the camera sensors. As such the camera display pixels only form a portion of the display screen.

The term "camera sensor(s)" shall mean an area or element that obtains image data. The camera sensor may be on a substrate and obtain image data by receiving light reflected of the item being imaged. This includes partially receiving the image data as a result of camera display pixels partially blocking light from being received by the camera sensors.

The term "image data" shall mean data associated with one or more of two-dimensional (2-D) images, three-dimensional (3-D) images, panoramic images, still images, and/or video images.

The term "degree of light capture" shall mean the amount, level, or extent to which camera sensors capture light through one or more of a display, a display layer, display pixels, or subpixel color elements as compared to light capture absent any obstruction.

The term "display information" shall mean any and all information, data, or the like related or associated with the display, and display pixels. Display information can include color of one or more display pixels, brightness of one or more display pixels, display pixel arrangement, whether one or more display pixels is activated, whether one or more display pixels is deactivated, or the like.

The term "auxiliary light output" shall mean any light provided at a display level by a light element that is not a display pixel. The light element may be on a substrate proximate the display screen, on a substrate that includes camera sensors, on or coupled to a display layer, etc. The light element may be a light emitting diode, a pixel, current controlled, etc. The light element may change colors, change intensity or brightness, activate, deactivate, or the like.

The term "obtains" and "obtaining", shall mean as used in connection with image data, other data, signals, information and the like, include at least one of i) accessing memory of an external device or remote server where the image data, other data, signals, information, etc. are stored, ii) receiving the image data, other data, signals, information, etc. at a remote server over a network connection. The remote server may also obtain the image data, other data, signals, information, etc. from local memory and/or from other memory, such as within a cloud storage environment and/or from the memory of a workstation.

The terms "processor," "a processor", "one or more processors" and "the processor" shall mean one or more processors. The one or more processors may be implemented by one, or by a combination of more than one implantable medical device, a wearable device, a local device, a remote device, a server computing device, a network of server computing devices and the like. The one or more processors may be implemented at a common location or at distributed locations. The one or more processors may implement the various operations described herein in a serial or parallel manner, in a shared-resource configuration and the like.

FIG. 1 illustrates an electronic device 100 that may be implemented in connection with devices having camera sensors positioned behind the display surface or display stack of the electronic device. For example, electronic devices having bezel-less and/or notch-less display surfaces may include front-facing cameras and/or camera sensors placed behind a display stack of an electronic device. Embodiments herein avoid certain difficulties in implementing camera sensors positioned behind the display stack of electronic devices, such as difficulties arising from the degradation of light capture of the camera sensor due to camera display pixels of the display stack positioned between the camera sensor and the scene. The electronic device 100 may be stationary or portable/handheld.

The electronic device 100 includes a display screen 102 that displays an image 103 thereon. The image may include colors, patterns, pictures, letters, numbers, symbols, etc. Specifically, as will be described in further detail herein, the display screen 102 in one example is a display stack that includes numerous display pixels that each individually provide a different display light output, such as color, brightness, or the like. The display pixels in combination provide a display light output that is provided to form the image on the display 102.

The display 102 includes a CUD region 104. At the CUD region 104 plural camera sensors 106 are provided underneath the display 102 on a substrate 108. The camera sensors 106 are configured to obtain and capture image data through openings defined by the display pixels. To this end, the display pixels proximate to the camera sensors 106 in the CUD region 104 are camera display pixels. In particular, the camera display pixels have a density that is less than a density of non-camera display pixels to define more openings and open space for the camera sensors to obtain the image data.

Also provided on the substrate 108 are plural light elements 110 proximate the openings defined by the camera display pixels. The light elements 110 in one example are light emitting diodes (LEDs). The light elements 110 are configured to be operated by one or more processors of the electronic device 100 to emit an auxiliary output light to supplement the display light output. Specifically, the one or more processors in example embodiments monitor the display to determine display information resulting from the display light output. The display information can include color of display pixels, brightness of display pixels, or the like. To this end, in one example, the one or more processors monitor the color and brightness of the display pixels.

In another embodiment, the one or more processors only monitor the camera display pixels. The one or more processors then modify the light elements based on the display information to provide the auxiliary light output that matches the camera display pixels proximate to each light element 110. Such matching can include matching a color, brightness, etc. By matching the camera display pixels with the auxiliary light output, the light elements provide a more aesthetically appealing look by mitigating the typical dark background resulting at the CUD region 104.

Figure 2A:
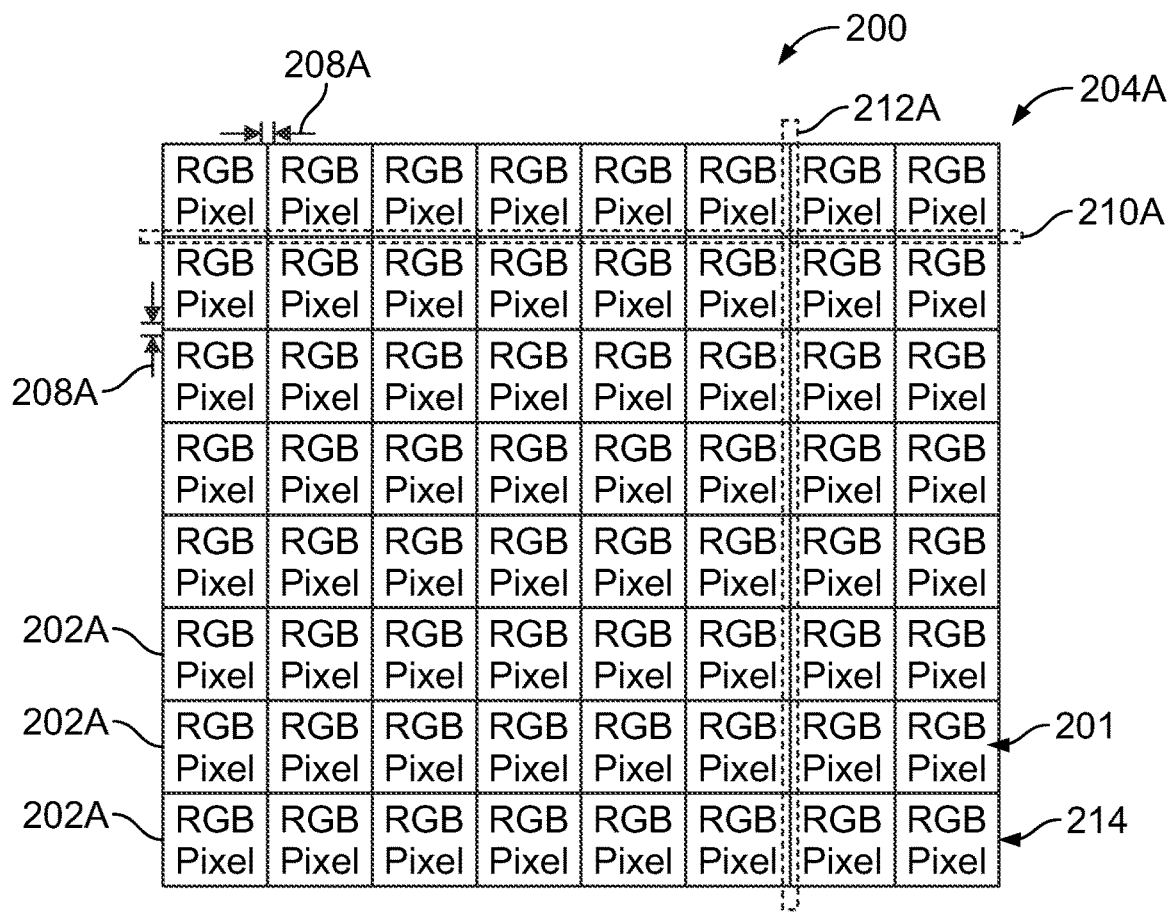
FIG. 2A illustrates one exemplary display stack in accordance with embodiments herein.

As illustrated in FIG. 2A, the display 102 in one example, is provided as a display stack 200 that includes an upper layer 201 with display pixels 202A arranged into a display matrix 204A. The display matrix 204A in one embodiment is a first resolution. The display pixels 202A are separated by openings 208A defined by the display pixels 202A. In one example, the display pixels are separated by openings 208A arranged into rows 210A and columns 212A. A bottom cathode layer 214 is provided as the final layer of the display stack 200, and operates to power the display pixels 202A.

Figure 2B:
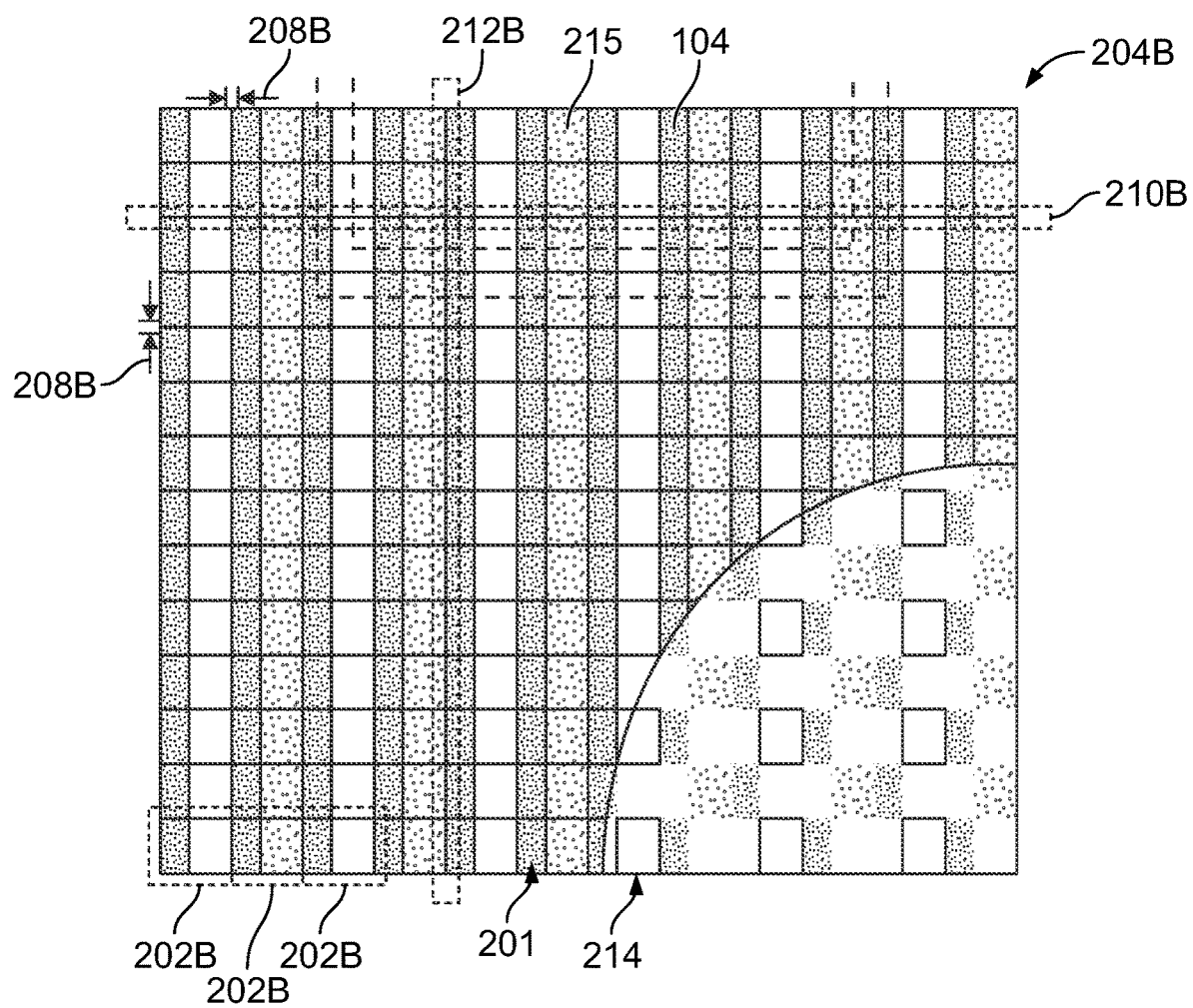
FIG. 2B illustrates another exemplary display stack in accordance with embodiments herein.

Additionally or alternatively, as illustrated in FIG. 2B, the display stack 200 includes display subpixel color elements 202B in the upper layer 201 arranged in a display matrix 204B. The display matrix 204B, in one example, has a first resolution. The display subpixel color elements 202B are separated by openings 208B. In one example, the display subpixel color elements are separated by openings 208B arranged into rows 210B and columns 212B. Each display subpixel color element 202B may include red, green, blue, yellow, white, or a like color primary. A plurality of subpixel color elements 202B cooperate to form a pixel, such as one of display pixels 202A in FIG. 2A. In an example, display matrix 204B may be the subpixel color element equivalent of display matrix 204A.

For the sake of clarity, unless context clearly dictates otherwise, pixels 202 refers to both display pixels 202A and display subpixel color elements 202B, display matrix 204 refers to both display matrix 204A and display matrix 204B, openings 208 refers to both openings 208A and openings 208B, rows 210 refers to both rows 210A and rows 210B, and columns 212 refers to both columns 212A and columns 212B.

At least a portion of the display stack 200 overlays the CUD region 104 such that a first subset of camera sensor pixels of the sensor matrix align with, and are covered by, camera display pixels 215 and a second subset of the camera sensor pixels of the sensor matrix align with, and are exposed through, the opening 208 defined by the camera display pixels 215. In particular, the camera display pixels 215 have a density that is less than a density of non-camera display pixels to allow more space for camera sensors and camera sensor pixels to obtain image data. In an example, the openings 208 may include at least a first row that overlays and exposes at least two rows of the camera sensor pixels and may include a first column that overlays and exposes at least two columns of the camera sensor pixels. Optionally, a third subset of the camera sensor pixels of the sensor matrix may be partially covered by the camera display pixels 215 and partially exposed through the openings 208 between the camera display pixels 215. Each of the first, second, and third subset of camera sensor pixels have varying degrees of light capture depending upon the amount each camera sensor pixel is covered, or not covered by corresponding proximate camera display pixels 215.

In one example, when the camera display pixels 215 define openings 208 arranged into rows 210 and columns 212, and image data represents the vertical and horizontal strips of the scene corresponding to the rows 210 and columns 212. Rows 210 and/or columns 212 opposite an opening 208 represent the first and second data segments.

Figure 2C:
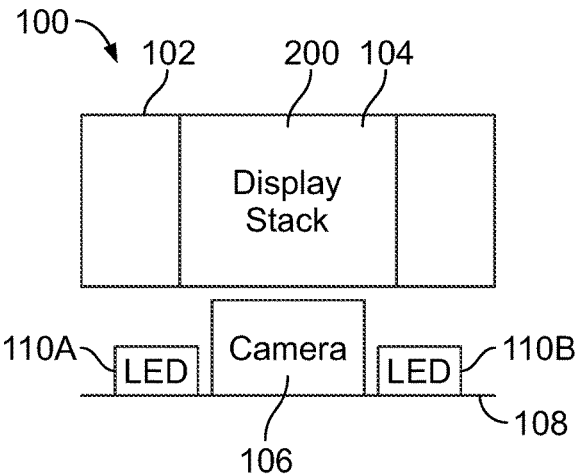
FIG. 2C illustrates an exemplary schematic block diagram of an electronic device in accordance with embodiments herein.
Figure 2D:
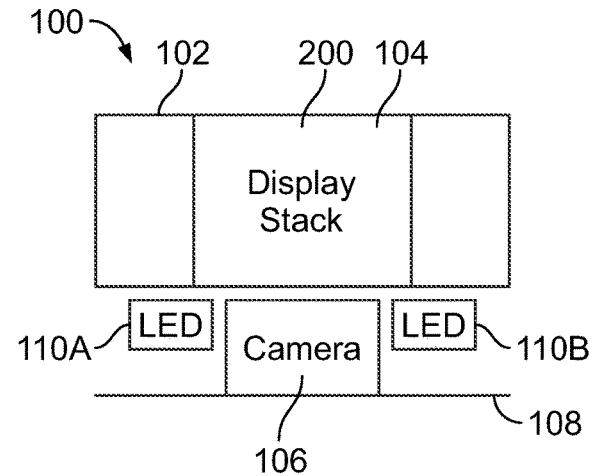
FIG. 2D illustrates an exemplary schematic block diagram of an electronic device in accordance with embodiments herein.

FIGS. 2C and 2D illustrate schematic block diagrams of alternative embodiments of the electronic device 100. In this embodiment, the display 102 includes the display stack 200 at the CUD region 104. The display stack 200 in examples includes an upper layer with camera display pixels, and openings defined by the camera display pixels. Similarly, the display stack can include a bottom cathode layer as also described above. As illustrated, a camera sensor 106 is placed on a substrate 108 underneath the display 102. The camera sensor 106 in one example is a camera sensor pixel. Alternatively, the camera sensor 106 includes plural camera sensor pixels. In yet another example, plural camera sensors 106 are spaced from one another. Such spacing in one example is equidistant, while in another example, the spacing is not equidistant. In all examples, the openings defined by the camera display pixels permit the passage of light therethrough that is captured by the camera sensor 106.

In the embodiment of FIG. 2C, the substrate 108 includes a first light element 110A and a second light element 110B on either side and adjacent the camera sensor 106. In one example, the substrate 108 is a printed circuit board that provides current to the first light element 110A and the second light element 110B to control the operation of the first light element 110A and the second light element 110B. In one example, the first light element 110A and second light element 110B each vary in light output, and specifically brightness depending upon the current provided through the substrate 108. In this manner, the intensity of the display light output is controlled by, and thus modified by controlling the current supplied to the first light element 110A and second light element 110B.

In another embodiment, the intensity of each of the first light element 110A and second light element 110B are not varied, and instead, the current supplied merely activates the first light element 110A and second light element 110B. In such an embodiment, when current flows to the first light element 110A and second light element 110B, the first light element 110A and second light element 110B activate. When current ceases to flow to the first light element 110A and second light element 110B, the first light element 110A and second light element 110B deactivate. In this manner, the first light element 110A and second light element 110B are modified by activating and deactivating each of the first and second light elements 110A, 110B.

In yet other examples, the first light element 110A is able to be modified by activating the first light element 110A, deactivating the first light element 110A, increasing the intensity or light output of the first light element 110A, decreasing the intensity or light output of the first light element 110A, etc. Meanwhile, in the embodiment, the second light element may be modified by activating the second light element 110B, and deactivating the second light element 110B.

In one embodiment, the first light element 110A is a first color, or has a first color characteristic, while the second light element 110B has a second color, or has a second color characteristic. In one example, the first light element 110A emits a red wavelength of light while the second light element 110B emits a blue wavelength of light. In such an example, based on display information, if the camera display pixels in the display stack proximate to the camera sensor 106 are red, only the first light element 110A emits light. Meanwhile, the second light element 110B does not emit light. Then, if according to the display information the camera display pixels proximate the camera sensor 106 change to the color blue, the first light element 110A deactivates, and the second light element 110B activates to emit blue light. Meanwhile, if the display information indicates that the camera display pixels proximate the camera sensor 106 change to a black color, then if either of the first light element 110A or second light element 110B are activated to emit a light output, the activated light element is modified to deactivate. In yet another example, if the display information indicates that the camera display pixels proximate to the camera sensor 106 are providing a purple color, then both the first light element 110A and second light element 110B are modified to be activated such that their combined auxiliary light output provides a purple color. In one such embodiment, the first light element 110A can be a directional light element, and the second light element 110B can also a directional light element. Each of the first light element 110A and second light element 110B are then directed to meet at an opening defined by the camera display pixels. In this manner, the auxiliary light output of the first light element 110A and second light element 110B is the combined light output that is purple, provided adjacent the camera display pixels that define the opening.

In the example embodiment of FIG. 2D, the first light element 110A and second light element 110B are not on the substrate 108; however, are still positioned on either side of and adjacent to the camera sensor 106. In this manner, the first light element 110A and second light element 110B emit light into the display stack 200 as desired to provide an auxiliary light output for the display 102. Still, the modifications to the first light element 110A and the second light element 110B can still be provided as described in relation to FIG. 2C. In particular, the first light element 110A and second light element 110B do not have to be located on a substrate. Instead, the first light element 110A and second light element 110B need only be positioned proximate to the camera display pixels such that the light emitted by the corresponding light element 110A and/or 110B is provided through the openings defined by the camera display pixels. To this end, the first light element 110A and/or second light element 110 can be directional light element, angled, etc.

Figure 2E:
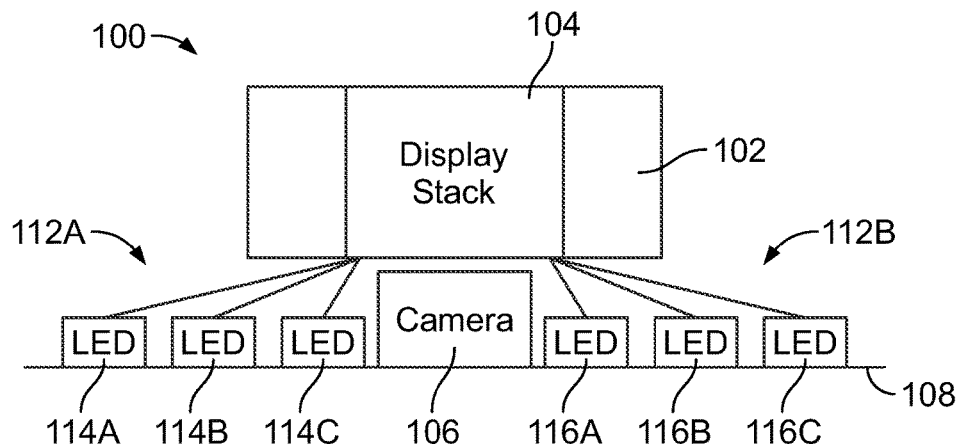
FIG. 2E illustrates an exemplary schematic block diagram of an electronic device in accordance with embodiments herein.

FIG. 2E illustrates yet another schematic block diagram of an example embodiment of the electronic device. In this embodiment, the electronic device 100 again includes the display 102 with a display stack 200 at the CUD region 104. The display stack 200 in examples includes an upper layer that includes camera display pixels, and openings defined by the camera display pixels. Similarly, the display stack can include a bottom cathode layer as also described above. Additionally, the electronic device 100 of the example embodiment of FIG. 2E includes a camera sensor 106 placed on a substrate 108. In this embodiment, instead of a first light element and a second light element, a first subset of light elements 112A and a second subset of light elements 112B are provided.

The first subset of light elements 112A includes a first light element 114A, a second light element 114B, and a third light element 114C. Similarly the second subset of light elements 112B includes a first light element 116A, a second light element 116B, and a third light element 116C. In one example embodiment, the first light element 114A of the first subset of light elements 112A emits a red wavelength of light, the second light element 114B of the first subset of light elements 112A emits a green wavelength of light, while the third light element 114C of the first subset of light elements 112A emits a blue wavelength of light. While applicant shall describe the characteristics of the first subset of light elements 112A herein, one appreciates, that the second subset of light elements 112B may consist of, and operate, in the same manner as described in relation to the first subset of light elements 112A.

In one example, when the first light element 114A of the first subset of light elements 112A emits a red wavelength of light, the second light element 114B of the first subset of light elements 112A emits a green wavelength of light, while the third light element 114C of the first subset of light elements 112A emits a blue wavelength of light, each light element 114A-C is directional such that the emitted light output converges at an opening defined by the camera display pixels. In this manner, depending upon the display information, and in particular, the color of proximate camera display pixels, each light element 114A-C can be modified to provide that color. Such modification can include deactivating one or more light elements while activating other light elements, activating one or more light element while activating other light elements, activating and/or deactivating one or more light elements and increasing the intensity of one or more light elements, activating and/or deactivating one or more light elements and decreasing the intensity of one or more light elements, etc. In particular, by modifying the red, green, and blue light elements in conjunction with one another, the light elements 114A-C may more easily match the color and intensity of the proximate camera display pixels.

Figure 2F:
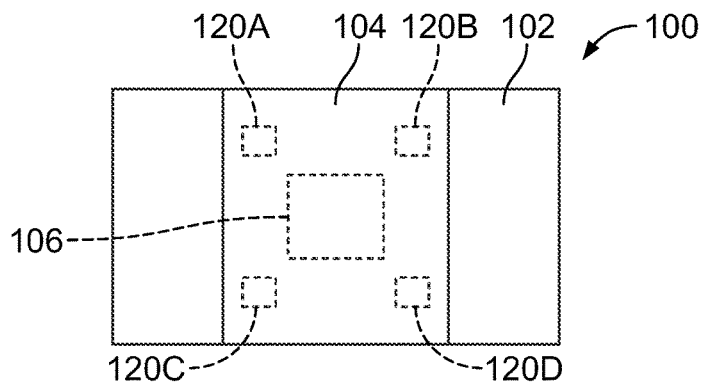
FIG. 2F illustrates an exemplary schematic block diagram of an electronic device in accordance with embodiments herein.

FIG. 2F illustrates yet another schematic block diagram of an example embodiment of the electronic device. This schematic block diagram presents a top view of the electronic device 100. In this embodiment, the electronic device 100 again includes the display 102 with a display stack 200 at the CUD region 104. The display stack 200 in examples includes an upper layer with camera display pixels, and openings defined by the camera display pixels. Similarly, the display stack can include a bottom cathode layer as also described above.

Additionally, the electronic device 100 of the example embodiment of FIG. 2F includes a camera sensor 106 placed on a substrate. In this embodiment, a first light element 120A, a second light element 120B, third light element 120C, and fourth light element 120D are provided. Each of the light elements 120A-D are spaced equidistant from one another forming points of a square about an opening defined by the camera display pixels. In other embodiments, the light elements 120A-D are not equidistant from one another. For example, the light elements 120A-D can form a rectangular shape about the camera sensor 106. Alternatively, additional light elements can be placed about the camera sensor 106. In one example, a circular pattern can be formed about the camera sensor 106.

In one example, each of the light elements 120A-D are directional, and converge at an opening defined by the camera display pixels. In this example, the first light element 120A emits a red wavelength light output, the second light element 120B emits a green wavelength light output, the third light element 120C emits a blue wavelength light output, and the fourth light element 120D emits a white light output. In this manner, the first, second, and third light elements 120A-C can be activated and deactivated in combination as described in relation to FIG. 2E to provide an auxiliary light output that matches the display light output of the camera display pixels proximate to the light elements 120A-D.

In addition, when the display information indicates that the camera display pixels are emitting a white display light output, the fourth light element 120D may be activated while the first, second, and third light elements 120A-C are deactivated to provide the white light through the opening defined by the camera display pixels. In addition, the white light of the fourth light element can be utilized in combination with any and all the first, second, and third light elements 120A-C to lighten or brighten any color provided by the first, second and third light elements 120A-C. In this manner, numerous color, tints, or the like may be provided by the combination of the light elements 120A-D to match the camera display pixels proximate to the light elements 120A-D.

Figure 3:
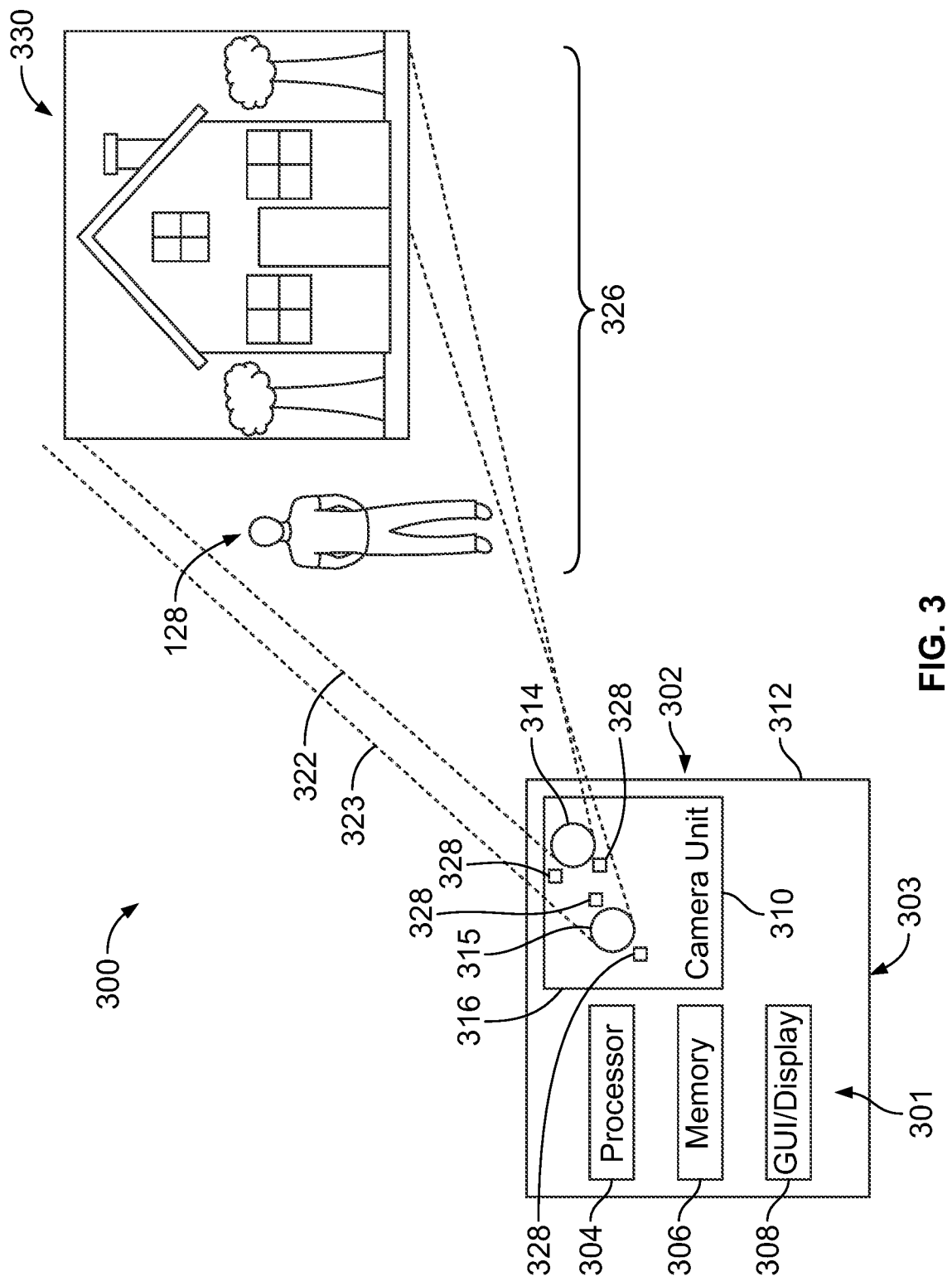
FIG. 3 illustrates a system for implementing a camera behind a display of a device in accordance with embodiments herein.

FIG. 3 illustrates a system 300 implementing a camera behind a display of an electronic device 302 in accordance with embodiments herein. The system 300 includes an electronic device 302 that may be stationary or portable/handheld. The electronic device 302 includes, among other things, a processor 304, local storage medium 306, and a graphical user interface (including a display) 308. The electronic device 302 also includes a CUD 310. In one example, the CUD 310 is a digital camera unit.

The electronic device 302 includes a housing 312 that holds the processor 304, local storage medium 306, user interface 308, display stack 316 (shown in FIG. 2A), and CUD 310. The housing 312 includes a display surface 301 and a back surface 303. A display stack 316 is positioned within in the housing 312 proximate to the display surface 301. In one embodiment, the display stack 316 includes an upper surface that has plural camera display pixels, and a bottom cathode layer that powers the camera display pixels. The CUD 310 also includes camera sensors 314, 315. The CUD 310 is oriented within the housing so camera sensors 314, 315 of the CUD 310 face the display surface 301. The display stack 316 lies between the display surface 301 and the camera sensors 314, 315 of the CUD 310.

Each camera sensor 314, 315 has a respective field of view 322, 323, and thus degrees of light capture. The CUD 310 operates under control of the processor 304 in order to capture image data for a scene 326 in the field of view 322, 323 of the corresponding camera sensors 314, 315. The camera sensors 314, 315 include camera sensor pixels to capture image data for the scene 326 in the field of view 322 of camera sensors 314, 315 of the CUD. The camera sensor pixels are arranged into a sensor matrix having a sensor resolution.

In one example, the camera sensors 314, 315 can be identical to each other but spatially offset from each other to produce different views of the scene 326. In another example, the camera sensor 314 may determine the point of view of the CUD 310 and the camera sensor 315, having a lower resolution, may measure image data, such as color data, depth data, infrared data, and the like, for the scene. Additionally or alternatively, the camera sensor 315 can be located over the display stack 316 and camera sensor 314 under the display stack 316.

Light elements 328 are disposed beneath the display stack 316 as described in more detail above. In particular, the light elements are placed proximate to openings defined by the camera display pixels in the CUD region. Specifically, the CUD region is the region where the CUD 310 is located in the electronic display. The CUD region includes all portions of the electronic device 302 that are vertical from the CUD 310. In this manner, the portions of the display stack located above the CUD 310 are considered the CUD region of the display. Additionally, as explained above, the display pixels in the CUD region of the display are the camera display pixels that define openings for the passage of light that allow the camera sensors 314, 315 to obtain, or capture image data.

The light elements 328 in one example are each positioned underneath the CUD region of the display to provide an auxiliary light output through the opening defined by the camera display pixels. Still, the light elements 328 in other embodiments are not underneath the CUD region of the display, and instead, at least some, if not all of the light elements are not under the CUD region of the display. Instead, the light elements are directional, angled, or the like to emit light through the openings defined by the camera display pixels.

In yet another example, light elements 328 are both underneath the CUD region of the display, and not underneath the CUD region of the display. Both the light elements underneath the CUD region of the display and the light element not underneath the CUD region of the display may be directional, angled, or the like, to emit wavelengths of a light output through an opening defined by the camera display pixels. In example embodiments, more than one light elements emit light through the same opening defined by the camera display pixels, including light that converges with one another. In this manner, the light elements can be controlled to provide numerous colors and intensities at a single opening defined by the camera display pixels.

Figure 4:
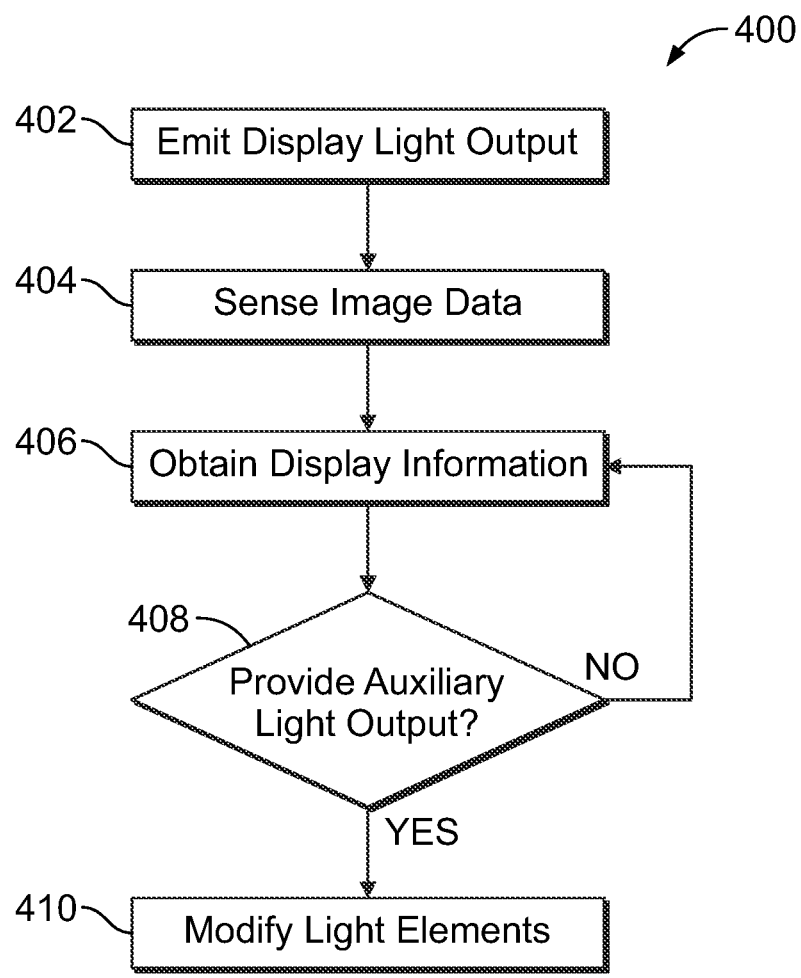
FIG. 4 illustrates a block flow diagram illustrating a method for displaying an image on a camera display in accordance with embodiments herein.

FIG. 4 illustrates a flow block diagram of a method 400 of displaying an image on a display screen of an electronic device. In one example the electronic device and system illustrated in FIGS. 1-3 are utilized to implement the method.

At 402, one or more processors operate display pixels of a display stack to emit a display light output. The display light output may be any type of image, including a picture, letter, number, background color, pattern, or the like. The display pixels include display pixels proximate the CUD region. Such display pixels are considered camera display pixels as described in more detail above.

At 404, the one or more processors operate camera sensors of a substrate located proximate to the display stack to sense image data through openings defined by the camera display pixels of the display pixels. In particular, while typically not in use, when an individual wanting to utilize the camera functionality of the electronic device, they may activate a camera application and cause image data to by obtained, and specifically captured by the camera sensors. In one example, all of the camera sensors are aligned to only be proximate openings defined by the camera display pixels. In other examples, at least some of the camera sensors are partially blocked by the camera display pixels. In other example, at least some camera sensors are completely blocked by some of the camera display pixels.

At 406, the one or more processors obtain display information associated with the display light output. In one example, the display pixels are monitored to determine a color, brightness, etc. of each display pixel. In one example, an amount of current to the display pixels from a bottom cathode layer within the display stack is monitored. In another example, the commands sent by the one or more processors to provide the display light output are monitored. In one embodiment, only the camera display pixels are monitored to determine a portion of the display light output provided at the CUD region.

At 408, a determination is made regarding whether one or more light elements should be modified to provide an auxiliary light output. Specifically, often a display merely shows a similar background, or an all-white, or all-black ground, or the like. Still, when an individual accesses an application, such as a particular webpage, image, meme, or the like, the display light output changes. If no change is determined when monitoring the display information at 408, then the one or more processors continue obtaining display information associated with the display light output for such changes.

If at 408, a determination is made that a change in the display light output has occurred that requires an auxiliary light output, then at 410 the one or more processors modify one or more light elements positioned proximate the camera sensors to emit an auxiliary light output through the opening defined by the camera display pixels based on the display information. To modify the light elements includes activating the one or more light elements, changing a color of an auxiliary light output from the one or more light elements, changing an intensity of the auxiliary light output from the one or more light elements, deactivating the one or more light elements, etc.

For example, when the CUD region had a display light output that was a black color, and a new display light output is to provide a white color at the CUD region, all of the light elements proximate the camera display pixels are activated. Alternatively, in an embodiment where multiple light elements of different colors emit through a specific opening defined by the camera display pixels, only light elements that produce white light are activated, while other colored lights are deactivated. In another alternative embodiment, light elements that when combined form white light may be activated, while light elements that do not combine to form with light are deactivated.

In another example, when a change in the display light output is provided where the camera display pixels are providing white light with all the light elements are activated, and a picture with all black in the CUD region is provided, all of the light elements deactivate. Similarly, only a portion, or one of the light elements deactivate depending on the display information received.

In another embodiment, the light elements are modified by changing a characteristic of one or more light elements. For example, the one or more light elements may either increase or decrease in brightness or intensity. In another example, the auxiliary light output may change. In this manner, if at the CUD region the picture of the camera display pixels are showing an orange and red portion of a picture, lights proximate to the red camera display pixels provide a red light output, while lights proximate to the orange camera display pixels provide orange light output. The orange light output can be provided directly by a light element that emits an orange light output, or by two or more light elements that emit light output that converges to form the orange light output. As a result the auxiliary light output is modified accordingly.

In yet another example, the light elements only emit white light, so, when the display information indicates that a light color is being provided by the camera display pixels proximate the one or more light elements, the one or more light elements emit the white light. Therefore, even though the color is not matched, by providing the white light instead of no light, a more aesthetically pleasing display is still provided. Similarly, when the display information indicates a darker color is provided, the light elements may deactivate. While again, not exactly matching the display, the look of the display is more aesthetically pleasing than if the white light was emitted. In particular, having no light emitted more closely matches the camera display pixels proximate to the light elements. In this manner, an aesthetically pleasing image is consistently provided for a user, enhancing enjoyment of the electronic device. Additionally, the chance of the CUD region becoming a darkened region over time is reduced, if not eliminated.

Conclusion

Before concluding, it is to be understood that although e.g. a software application for undertaking embodiments herein may be vended with a device such as the system 100, embodiments herein apply in instances where such an application is e.g. downloaded from a server to a device over a network such as the Internet. Furthermore, embodiments herein apply in instances where e.g. such an application is included on a computer readable storage medium that is being vended and/or provided, where the computer readable storage medium is not a carrier wave or a signal per se.

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the units/modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, in the following claims, the phrases "at least A or B", "A and/or B", and "one or more of A and B" (where "A" and "B" represent claim elements), are used to encompass i) A, ii) B and/or iii) both A and B.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A device, comprising:
   a display stack having display pixels;

at least one camera sensor located proximate to the display stack;
one or more light elements located proximate the at least one camera sensor;
a processor; and
a memory storing program instructions accessible by the processor, wherein, responsive to execution of the program instructions, the processor configured to:
obtain display information associated with the display pixels; and
modify the one or more light elements based on the display information;
wherein the at least one camera sensor is coupled to a substrate; and
wherein the display stack includes an upper layer having the display pixels and a bottom cathode layer; and the substrate is below the bottom cathode layer.

2. The device of claim 1, wherein the display pixels include camera display pixels that are positioned proximate of the at least one camera sensor.

3. The device of claim 2, wherein the camera display pixels define openings utilized by the at least one camera sensor to obtain image data.

4. The device of claim 3, wherein the one or more light elements are positioned to emit an auxiliary light output through the openings defined by the camera display pixels.

5. The device of claim 1, wherein the one or more light elements are light emitting diodes.

6. The device of claim 1, wherein the display information includes at least one of color of display pixels, or brightness of display pixels.

7. The device of claim 1, wherein to modify the one or more light elements includes at least one of activating the one or more light elements, changing a color of an auxiliary light output from the one or more light elements, changing an intensity of the auxiliary light output from the one or more light elements, or deactivating the one or more light elements.

8. The device of claim 1, wherein to modify the one or more light elements includes matching a color of a light element of the one or more light elements to a color of a display pixel of the display pixels.

9. A method, comprising:
under control of one or more processors including program instructions to:
emit, with display pixels of a display stack, a display light output, wherein the display stack includes an upper layer having the display pixels and a bottom cathode layer;
sense, with at least one camera sensor located proximate to the display stack and coupled to a substrate that is below a bottom cathode layer, image data through openings defined by camera display pixels of the display pixels, the camera display pixels located proximate the at least one camera sensor;
obtain display information associated with the display light output; and
modify one or more light elements positioned proximate the at least one camera sensor to emit an auxiliary light output through the openings defined by the camera display pixels based on the display information.

10. The method of claim 9, wherein to modify the one or more light elements comprises activating at least one light element of the one or more light elements.

11. The method of claim 9, wherein to modify the one or more light elements comprises at least one of changing a color or brightness of an auxiliary light output of the one or more light elements.

12. The method of claim 9, wherein to modify the one or more light elements comprises deactivating at least one light element of the one or more light elements.

13. The method of claim 9, wherein to obtain the display information includes at least determining a brightness or color of a display pixel of the display pixels.

14. The method of claim 9, wherein to obtain the display information includes only obtaining the display information from the camera display pixels.

15. A device, comprising:
a substrate including at least one camera sensor configured to obtain image data;
a first light element located proximate the at least one camera sensor;
a display stack including an upper layer having display pixels and a bottom cathode layer above the substrate;
a processor; and
a memory storing program instructions accessible by the processor, wherein, responsive to execution of the program instructions, the processor configured to:
obtain display information associated with camera display pixels of a display substrate proximate to the at least one camera sensor; and
modify the first light element based on the display information.

16. The device of claim 15, wherein the first light element is a light emitting diode.

17. The device of claim 15, further comprising a second light element located proximate the at least one camera sensor, wherein the processor is further configured to modify the second light element to be one of a different color or brightness than the first light element based on the display information.

18. The device of claim 15, further comprising a second light element located proximate the at least one camera sensor, wherein the processor is further configured to activate the first light element while deactivating the second light element based on the display information.

19. The device of claim 15, wherein the display pixels include the camera display pixels that are positioned proximate of the at least one camera sensor.

20. The device of claim 19, wherein the camera display pixels define openings utilized by the at least one camera sensor to obtain the image data.

* * * * *